US009843790B2

(12) United States Patent
Lucente

(10) Patent No.: US 9,843,790 B2
(45) Date of Patent: Dec. 12, 2017

(54) DYNAMIC AUTOSTEREOSCOPIC DISPLAYS

(71) Applicant: FOVI 3D, INC., Austin, TX (US)

(72) Inventor: Mark E. Lucente, Austin, TX (US)

(73) Assignee: FOVI 3D, INC., Austin, TX (US)

( * ) Notice: Subject to any disclaimer, the term of this patent is extended or adjusted under 35 U.S.C. 154(b) by 137 days.

(21) Appl. No.: 14/251,622

(22) Filed: Apr. 13, 2014

(65) Prior Publication Data

US 2015/0296203 A1 Oct. 15, 2015
US 2016/0044303 A9 Feb. 11, 2016

Related U.S. Application Data

(63) Continuation of application No. 12/258,438, filed on Oct. 26, 2008, now abandoned, which is a
(Continued)

(51) Int. Cl.
G09G 5/00 (2006.01)
G03H 1/04 (2006.01)
(Continued)

(52) U.S. Cl.
CPC ....... H04N 13/0425 (2013.01); G03H 1/0808 (2013.01); G03H 1/2294 (2013.01); G03H 1/268 (2013.01); H04N 13/0409 (2013.01)

(58) Field of Classification Search
CPC ............. G03H 1/268; G03H 2001/269; H04N 13/0409; H04N 13/0425
(Continued)

(56) References Cited

U.S. PATENT DOCUMENTS 4,655,542 A 4/1987 Dube
4,752,824 A 6/1988 Moore
(Continued)

FOREIGN PATENT DOCUMENTS

| DE | 10252830 B3 | 5/2004 | ............. H04N 13/00 |
| EP | 0316465 B1 | 10/1993 | ............. H04N 13/04 |
| EP | 1659441 A1 | 5/2006 | ........... G02F 1/1335 |
| EP | 1705927 A1 | 9/2006 | ............. H04N 13/00 |
| GB | 2329786 A | 3/1999 | ............... H04N 5/74 |
| JP | 2000-352606 | 12/2000 | ............... G02B 3/00 |
| JP | 2007-071922 | 3/2007 | ............. G03B 35/08 |

(Continued)

OTHER PUBLICATIONS

M. W. Halle, "The Generalized Holographic Stereogram," Master's thesis, MIT (retrieved from http://hdl.handle.net/1721.1/13762), 124 pages, 1991.
(Continued)

Primary Examiner — Prabodh M Dharia
(74) Attorney, Agent, or Firm — G+J Law Group PLLC; Georgios A. Georgakis; Cyrus F. Bharucha

(57) ABSTRACT

Display devices can be used to provide display functionality in dynamic autostereoscopic displays. One or more display devices are coupled to one or more appropriate computing devices. These computing devices control delivery of autostereoscopic image data to the display devices. A lens array coupled to the display devices, e.g., directly or through some light delivery device, provides appropriate conditioning of the autostereoscopic image data so that users can view dynamic autostereoscopic images. Methods and systems for calibrating a hogel display are also described, including generating calibration hogel data corresponding to a calibration pattern; generating a hogel light field from the calibration hogel data; detecting the hogel light field; and determining calibration data by analyzing a set of hogel properties in response to detecting the hogel light field. The methods and systems may further include generating a calibrated hogel light field by generating calibrated hogel data using the calibration data.

19 Claims, 8 Drawing Sheets

Related U.S. Application Data continuation-in-part of application No. 11/834,005, filed on Aug. 5, 2007, now abandoned, which is a continuation-in-part of application No. 11/724,832, filed on Mar. 15, 2007, now abandoned.

(60) Provisional application No. 60/782,345, filed on Mar. 15, 2006.

(51) Int. Cl.
| | | |
|---|---|---|
| *H04N 13/04* | (2006.01) | |
| *G03H 1/26* | (2006.01) | |
| *G03H 1/08* | (2006.01) | |
| *G03H 1/22* | (2006.01) | |

(58) Field of Classification Search
USPC ...... 345/9, 204, 418–420, 502, 632; 348/40, 348/43, 13–13.03; 359/1, 3, 9, 15, 22, 359/23, 32, 35, 463; 382/154; 361/681, 361/679.01
See application file for complete search history.

(56) References Cited

U.S. PATENT DOCUMENTS

| | | | |
|---|---|---|---|
| 4,913,534 A * | 4/1990 | Lafleur | G03H 1/0248 359/300 |
| 5,132,839 A | 7/1992 | Travis | |
| 5,208,685 A * | 5/1993 | Aleksoff | G06E 3/005 250/208.1 |
| 5,359,454 A | 10/1994 | Steenblik et al. | |
| 5,506,702 A * | 4/1996 | Simpson | G02B 5/32 250/203.1 |
| 5,521,724 A | 5/1996 | Shires | |
| 5,781,229 A | 7/1998 | Zediker et al. | |
| 5,801,761 A | 9/1998 | Tibor | |
| 5,815,222 A | 9/1998 | Matsuda et al. | |
| 5,887,090 A * | 3/1999 | Rudolph | H04Q 11/0001 359/10 |
| 5,937,105 A | 8/1999 | Katayama et al. | |
| 5,949,559 A | 9/1999 | Kihara et al. | |
| 5,963,350 A * | 10/1999 | Hill | H04Q 11/0001 398/1 |
| 5,976,017 A | 11/1999 | Omori et al. | |
| 5,990,937 A | 11/1999 | Masayoshi | |
| 6,061,083 A | 5/2000 | Aritake et al. | |
| 6,072,606 A | 6/2000 | Huether et al. | |
| 6,084,587 A | 7/2000 | Tarr et al. | |
| 6,100,862 A | 8/2000 | Sullivan | |
| 6,128,132 A | 10/2000 | Wieland et al. | |
| 6,151,168 A | 11/2000 | Goering et al. | |
| 6,191,796 B1 | 2/2001 | Tarr | |
| 6,195,184 B1 | 2/2001 | Chao et al. | |
| 6,211,848 B1 | 4/2001 | Plesniak et al. | |
| 6,330,088 B1 | 12/2001 | Klug et al. | |
| 6,366,370 B1 | 4/2002 | Holzbach et al. | |
| 6,417,638 B1 | 7/2002 | Guy et al. | |
| 6,421,048 B1 | 7/2002 | Shih et al. | |
| 6,512,609 B1 * | 1/2003 | Klug | G03H 1/26 353/30 |
| 6,533,420 B1 | 3/2003 | Eichenlaub | |
| 6,549,308 B1 | 4/2003 | Camahort | |
| 6,552,722 B1 | 4/2003 | Shih et al. | |
| 6,587,618 B2 | 7/2003 | Raguin et al. | |
| 6,671,651 B2 | 12/2003 | Goodwin et al. | |
| 6,721,101 B2 | 4/2004 | Daniell | |
| 6,729,541 B1 | 5/2004 | Kurokawa et al. | |
| 6,736,512 B2 | 5/2004 | Balogh | |
| 6,795,241 B1 | 9/2004 | Holzbach | |
| 6,798,406 B1 | 9/2004 | Jones et al. | |
| 6,806,982 B2 | 10/2004 | Newswanger et al. | |
| 6,859,293 B2 | 2/2005 | Klug et al. | |
| 6,868,177 B1 * | 3/2005 | Camahort | G03H 1/08 345/418 |
| 6,900,904 B1 * | 5/2005 | Holzbach | G03H 1/02 358/1.15 |
| 6,930,811 B2 | 8/2005 | Brotherton-Ratcliffe et al. | |
| 7,043,073 B1 * | 5/2006 | Holzbach | G03H 1/268 345/418 |
| 7,116,626 B1 | 10/2006 | Woods et al. | |
| 7,190,496 B2 * | 3/2007 | Klug | G03H 1/22 345/9 |
| 7,227,674 B2 | 6/2007 | Klug et al. | |
| 7,230,746 B2 | 6/2007 | Cameron et al. | |
| 7,558,421 B1 * | 7/2009 | Holzbach | G03H 1/268 345/418 |
| 7,605,961 B2 | 10/2009 | Klug et al. | |
| 7,729,579 B1 * | 6/2010 | Greiner | G02B 6/124 385/14 |
| 7,839,549 B2 | 11/2010 | Mihajlovic | |
| 8,098,275 B2 | 1/2012 | Keating, III et al. | |
| 2001/0028356 A1 | 10/2001 | Balogh | |
| 2002/0075282 A1 | 6/2002 | Vetterli et al. | |
| 2002/0080302 A1 | 6/2002 | Dubin et al. | |
| 2003/0039031 A1 | 2/2003 | Redert | |
| 2003/0086136 A1 | 5/2003 | Orr et al. | |
| 2003/0146908 A1 * | 8/2003 | Favalora | G09G 3/00 345/204 |
| 2004/0027394 A1 | 2/2004 | Schonberg | |
| 2004/0042161 A1 | 3/2004 | Cameron et al. | |
| 2004/0050280 A1 | 3/2004 | Rodin et al. | |
| 2004/0212882 A1 | 10/2004 | Liang et al. | |
| 2004/0240015 A1 | 12/2004 | Newswanger et al. | |
| 2004/0263970 A1 | 12/2004 | McKee | |
| 2005/0002074 A1 | 1/2005 | McPheters et al. | |
| 2005/0052714 A1 * | 3/2005 | Klug | G03H 1/22 359/3 |
| 2005/0062905 A1 | 3/2005 | Kim et al. | |
| 2005/0094281 A1 * | 5/2005 | Favalora | G02B 26/106 359/619 |
| 2005/0128214 A1 | 6/2005 | Tseng | |
| 2005/0243367 A1 | 11/2005 | Holzbach et al. | |
| 2005/0264651 A1 | 12/2005 | Saishu et al. | |
| 2005/0270645 A1 | 12/2005 | Cossairt et al. | |
| 2005/0280894 A1 | 12/2005 | Hartkop et al. | |
| 2005/0285027 A1 | 12/2005 | Favalora et al. | |
| 2006/0039048 A1 | 2/2006 | Carver et al. | |
| 2006/0152780 A1 * | 7/2006 | Klug | G03H 1/18 359/3 |
| 2006/0181682 A1 | 8/2006 | Miller et al. | |
| 2007/0030544 A1 | 2/2007 | Brotherton-Ratcliffe et al. | |
| 2007/0058127 A1 | 3/2007 | Mather et al. | |
| 2007/0064098 A1 | 3/2007 | Tran | |
| 2007/0081207 A1 | 4/2007 | Bimber | |
| 2007/0113012 A1 | 5/2007 | Cable et al. | |
| 2007/0121028 A1 | 5/2007 | Mihajlovic et al. | |
| 2007/0165013 A1 | 7/2007 | Goulanian et al. | |
| 2007/0223071 A1 | 9/2007 | Cameron et al. | |
| 2007/0247519 A1 | 10/2007 | Riaziat et al. | |
| 2008/0008076 A1 | 1/2008 | Raguin et al. | |
| 2008/0012850 A1 | 1/2008 | Keating, III et al. | |
| 2008/0144174 A1 | 6/2008 | Lucente et al. | |
| 2008/0170293 A1 | 7/2008 | Lucente et al. | |
| 2008/0204663 A1 | 8/2008 | Balogh | |
| 2010/0277928 A1 | 11/2010 | Fancello et al. | |

FOREIGN PATENT DOCUMENTS

| | | | | |
|---|---|---|---|---|
| WO | WO 01/48543 A1 | 7/2001 | ........... | G02F 1/1333 |
| WO | WO 2005/117458 | 12/2005 | ............ | H04N 13/00 |
| WO | WO 2006/021283 | 3/2006 | ............ | H04N 13/00 |
| WO | WO 2007/039868 | 4/2007 | ............ | H04N 13/00 |
| WO | WO 2008/048360 | 4/2008 | | |

OTHER PUBLICATIONS

J. H. Kulick, et al., "Partial Pixels: A Three-Dimensional Diffractive Display Architecture," *J. Opt. Soc. Am. A*, 12(1), pp. 73-83 (1995).

G. P. Nordin, et al., "A 3-D Display Utilizing a Diffractive Optical Element and an Active Matrix Liquid Crystal Display," *Opt. Eng.* 35(12), pp. 3404-3412 (1996).

(56) References Cited

OTHER PUBLICATIONS

M. Levoy and P. Hanrahan, "Light Field Rendering," in *Computer Graphics Proceedings, Annual Conference Series (ACM SIG-GRAPH '96*, New Orleans, La., Aug. 4-9, 1996), pp. 31-42 (1996).
M. Halle and A. Kropp, "Fast computer graphics rendering for full parallax spatial displays," *Proc. SPIE* vol. 3011, p. 105-112, *Practical Holography XI and Holographic Materials III* (Apr. 1997).
M. W. Handle, "Multiple Viewpoint Rendering for Three-Dimensional Displays," Ph.D. thesis, MIT (retrieved from http://hdl.handle.net/1721.1/29127), 164 pages, 1997.
W. Plesniak and M. Klug, "Tangible holography: adding synthetic touch to 3D display," published in *Proceedings of the IS&T/SPIE's Symposium on Electronic Imaging, Practical Holography XI*, 8 pages (1997).
T. A. Leskova, et al., "The design and fabrication of one-dimensional random surfaces with specified scattering propertes," *Physics of the Solid State*, vol. 41, Iss. 5, pp. 835-841 (May 1999).
M. Lucente, "Interactive holographic displays: the first 10 years," book chapter in *Holography. The first 50 years (Springer Series in Optical Sciences* vol. 78), Springer-Verlag (Berlin), editor J.-M. Fournier, ISBN # 3540670750, Feb. 2004.
M. Kawakita, et al., "Improvements of 3-D image quality in integral display by reducing distortion errors," *SPIE Proceedings*, vol. 6803, Apr. 2, 2008.
Search Report for International Application No. PCT/US02008/072121, 6 pages, dated Dec. 29, 2008.
Search Report for International Application No. PCT/US2007/006568, 6 pages, dated Nov. 27, 2008.
E. Ogg, "Toshiba unveils 3-D TV that doesn't need special glasses," *CNN Tech* website, 2 pages, Oct. 5, 2010.

\* cited by examiner

DYNAMIC AUTOSTEREOSCOPIC DISPLAYS

This application is a continuation application of co-pending U.S. patent application Ser. No. 12/258,438, filed on Oct. 26, 2008, titled "Systems and Methods for Calibrating a Hogel 3D Display," and naming Mark E. Lucente as inventor, which in turn is a continuation-in part application of U.S. patent application Ser. No. 11/834,005, filed Aug. 5, 2007, titled "Dynamic Autostereoscopic Displays," and naming Mark E. Lucente, Tizhi Huang, Thomas L. Burnett III, Michael A. Klug, Anthony W. Heath, and Mark E. Holzbach as inventors, which in turn is a continuation-in-part application of U.S. patent application Ser. No. 11/724,832, filed Mar. 15, 2007, titled "Dynamic Autostereoscopic Displays," and naming Mark E. Lucente, Michael A. Klug, Anthony W. Heath, Tizhi Huang, and Mark E. Holzbach as inventors, which in turn claims the benefit, under 35 U.S.C. §119(e), of U.S. Provisional Application No. 60/782,345, filed Mar. 15, 2006, entitled "Active Autostereoscopic Emissive Displays," and naming Mark Lucente, Michael Klug, Mark Holzbach, Tizhi Huang, and Anthony Heath as inventors.

The above-referenced patents and/or patent applications are hereby incorporated by reference herein in their entirety.

The U.S. Government has a paid-up license in this invention and the right in limited circumstances to require the patent owner to license others on reasonable terms as provided for by the terms of contract No. N61339-06-C-0165 awarded by DARPA.

FIELD OF THE INVENTION

The invention relates generally to the field of hogel-based displays.

SUMMARY

In one respect, disclosed is a method for calibrating a hogel display, the method including: generating calibration hogel data corresponding to a calibration pattern; generating a hogel light field from the calibration hogel data; detecting the hogel light field; and determining calibration data by analyzing a set of hogel properties in response to detecting the light field.

In another respect, disclosed is a system for calibrating a hogel display, the system including: one or more processors; one or more memory units coupled to the one or more processors; one or more light sensors coupled to the one or more processors; and one or more hogel light modulators coupled to the one or more processors; the system being configured to generate calibration hogel data corresponding to a calibration pattern, the one or more light modulators being configured to generate a hogel light field from the calibration hogel data, the system being configured to determine calibration data by analyzing a set of hogel properties in response to the one or more light sensors detecting the hogel light field.

In another respect, disclosed is a computer program product stored on a computer operable medium, the computer program product including software code being effective to: generate calibration hogel data corresponding to a calibration pattern; cause a hogel light modulator to generate a hogel light field from the hogel data; determine calibration data by analyzing a set of hogel properties in response to causing the light sensor to detect the hogel light field.

In another respect, disclosed is a method for calibrating a hogel display, the method including: providing calibration data, the calibration data having been determined by having generated calibration hogel data corresponding to a calibration pattern; having generated a hogel light field from the hogel data; having detected the hogel light field; and having determined the calibration data by having analyzed a set of hogel properties in response to having detected the hogel light field; generating a calibrated set of hogel data using the calibration data; and generating a calibrated hogel light field using the calibrated set of hogel data.

In another respect, disclosed is a system for calibrating a hogel display, the system including: one or more processors; one or more memory units coupled to the one or more processors; and one or more hogel light modulators coupled to the one or more processors; the system being configured to be provided with calibration data, the calibration data having been determined by having generated calibration hogel data corresponding to a calibration pattern; having generated a hogel light field from the hogel data; having detected the hogel light field; and having determined the calibration data by having analyzed a set of hogel properties in response to having detected the hogel light field; the system being configured to generate a calibrated set of hogel data using the calibration data; the one or more hogel light modulators being configured to generate a calibrated hogel light field using the calibrated set of hogel data.

In another respect, disclosed is a computer program product stored on a computer operable medium, the computer program product including software code being effective to: be provided with calibration data, the calibration data having been determined by having generated calibration hogel data corresponding to a calibration pattern; having generated a hogel light field from the hogel data; having detected the hogel light field; and having determined the calibration data by having analyzed a set of hogel properties in response to having detected the hogel light field; generate a calibrated hogel data using the calibration data; and cause one or more hogel light modulators to generate a calibrated hogel light field using the calibrated set of hogel data.

Numerous additional embodiments are also possible. In one or more various aspects, related articles, systems, and devices include but are not limited to circuitry, programming, electro-mechanical devices, or optical devices for effecting the herein referenced method aspects; the circuitry, programming, electro-mechanical devices, or optical devices can be virtually any combination of hardware, software, and firmware configured to effect the herein referenced method aspects depending upon the design choices of the system designer skilled in the art.

The foregoing is a summary and thus contains, by necessity, simplifications, generalizations and omissions of detail; consequently, those skilled in the art will appreciate that the summary is illustrative only and is not intended to be in any way limiting. Other aspects, features, and advantages of the devices, processes, or other subject matter described herein will become apparent in the teachings set forth herein.

In addition to the foregoing, various other method, device, and system aspects are set forth and described in the teachings such as the text (e.g., claims or detailed description) or drawings of the present disclosure.

BRIEF DESCRIPTION OF THE DRAWINGS

Other aspects and advantages of the invention may become apparent upon reading the detailed description and upon reference to the accompanying drawings.

Figure 1:
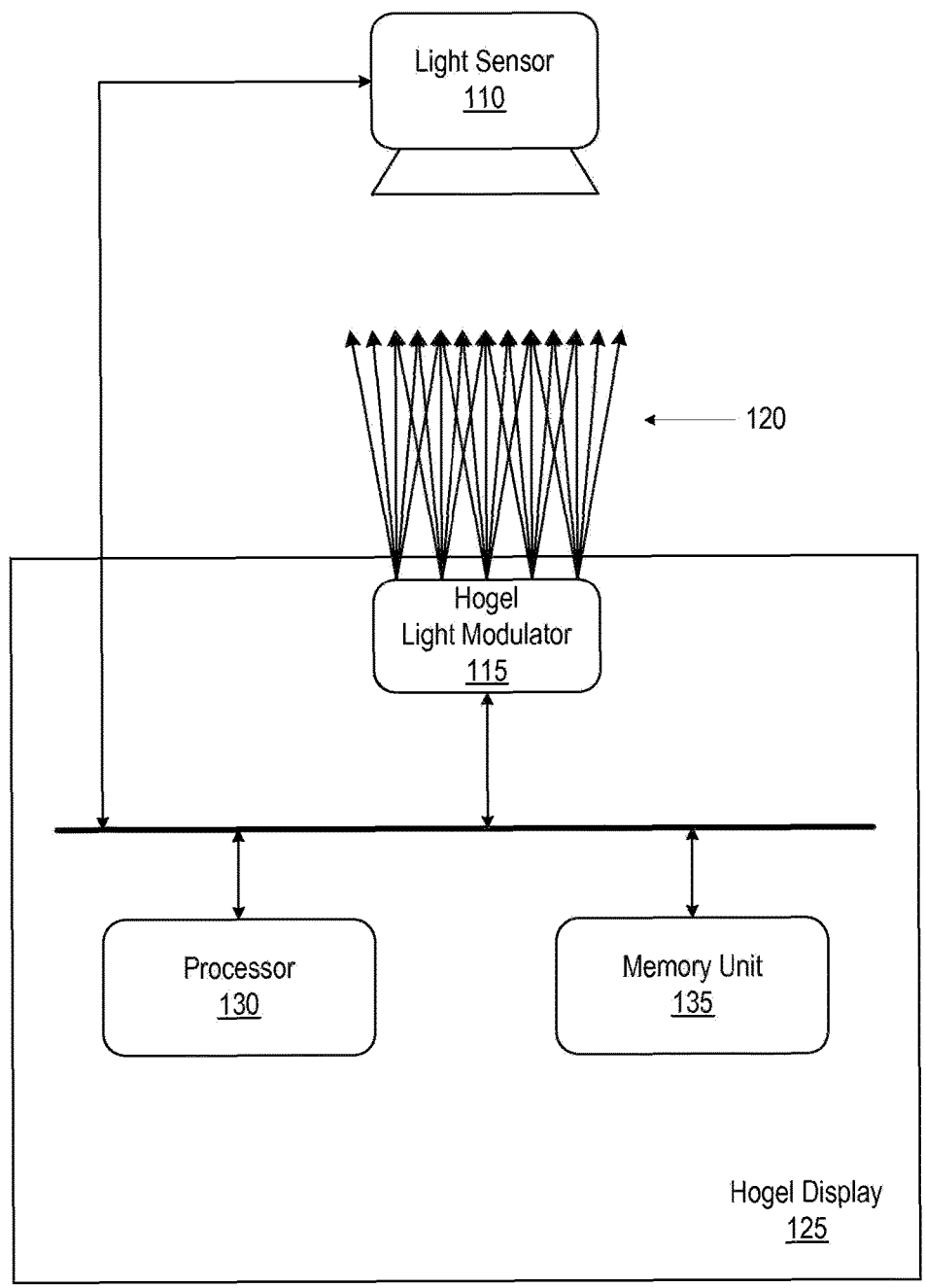
FIG. 1 is a block diagram illustrating a system for calibrating a hogel display, in accordance with some embodiments.

While the invention is subject to various modifications and alternative forms, specific embodiments thereof are shown by way of example in the drawings and the accompanying detailed description. It should be understood, however, that the drawings and detailed description are not intended to limit the invention to the particular embodiments. This disclosure is instead intended to cover all modifications, equivalents, and alternatives falling within the scope of the present invention as defined by the appended claims.

DETAILED DESCRIPTION

Certain terms are used throughout the following description and claims to refer to particular system components and configurations. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the terms "couple," "couples," "coupled," or "coupleable" are intended to mean either an indirect or direct electrical or wireless connection. Thus, if a first device couples to a second device, that connection may be through a direct electrical, optical, wireless connection, etc. or through an indirect electrical, optical, wireless connection, etc. by means of other devices and connections.

One or more embodiments of the invention are described below. It should be noted that these and any other embodiments are exemplary and are intended to be illustrative of the invention rather than limiting. While the invention is widely applicable to different types of systems, it is impossible to include all of the possible embodiments and contexts of the invention in this disclosure. Upon reading this disclosure, many alternative embodiments of the present invention will be apparent to persons of ordinary skill in the art. Other embodiments may be utilized, and other changes may be made, without departing from the spirit or scope of the subject matter presented here.

In some embodiments, systems and methods for calibrating hogel-based 3D displays are disclosed. A hogel display, as used here, includes an array of hogels (as opposed to an array of pixels for a standard, 2D display) arranged on a 2D surface. The hogel array may or may not be a regular array. For example, the hogel array may be denser in the middle than the edges of the hogel display. The hogel display is configured to modulate light not only as a function of location but also as a function of direction (or angle) as the light emerges from each hogel. That is, a hogel is substantially a point—a specific spatial element of hogel data—on the 2D surface from which light emerges having controlled color and intensity in different directions from the hogel.

Accordingly, values of intensity and color for a hogel display are associated with four coordinates: two for representing the hogel's spatial location on the surface and two more for representing the direction in which the light emerges from the hogel. Each physical hogel may be thought of as emitting a group of "hogel beams" (or generally a hogel light field) emerging from the hogel and travelling in different directions. Two coordinates may define the spatial location of the hogel on the 2D hogel surface and two angular coordinates may define a particular hogel beam of light emerging from the hogel. In contrast, a pixel is a point on a surface whose intensity and color are controlled independent of direction, and values of intensity and color are associated with two coordinates representing the pixel's spatial location on the surface of the display. By being able to control the color and intensity of light in different directions emerging from multiple hogels, auto-viewable 3D images may be generated. The auto-viewable 3D images can be experienced without additional equipment, such as special eyewear, and without the position of the eyes being required.

It should be noted that depending on the technology used to implement the hogel display, there may or may not be simple mapping between hogel data elements and resulting hogel beams (or hogel light field). For example, there may not be a one-to-one correspondence between hogel data elements and particular hogel beams but a many-to-many relationship may exist between hogel data elements and hogel beams (or hogel light field). Such may be the case, for example, when holographic optical elements are used. The calibration methods and systems described here apply to all these various embodiments.

It should also be noted that images having less than full parallax may also be generated, such as images having horizontal or uni-directional parallax, for example. Images having no parallax may also be generated, such as images displaying different images at different angular views.

It should also be noted that the 2D hogel surface may be of any shape such as flat, concave, convex, spherical, etc as well as any 2D manifold—a 2D surface of essentially any shape (such as a piece of cloth).

It should further be noted that color and intensity may refer to values of the three primary colors red, green, and blue (which may be used to represent different hues of color) but may also refer to a wavelength value or a spectrum (sum) of wavelength values of varying intensity or a combination of these.

It should further be noted that though hogel spatial locations may be specified using two coordinates—when the hogel surface is known, for example—in some embodiments, the spatial location of the hogels may be specified using three coordinates.

In some embodiments, the hogel display is configured to receive and convert 3D data to hogel data, which may then be used by the hogel display to produce a 3D image. Hogel data may be a 4D array of color and intensity values—two coordinates designating spatial location and two coordinates designating angular direction from each location as described above. The 3D data may be presented in variety of different formats such as VRML and from different applications such as Sketchup, GlobalManager, ProEngineer, etc. The 3D data may be generated, for example, by scans of real world scenery or objects or the 3D data may be generated by a computer.

Different types of technology may be used to implement a hogel display. In some embodiments, the hogel display may include a "traditional" 2D light modulator in combination with optics for converting the spatially modulated pixels to directionally modulated hogel beams. Spatial light modulators, may use a variety of technologies, including electro-optics, magneto-optic, acousto-optic, nonlinear optic, micro-electro-mechanical systems, and electrophoretic. In such embodiments, each hogel may be represented by a sub-array of pixels, such as an array of 10×10 pixels, an array of 100×200 pixels, etc. Directional modulation of the light may be accomplished by mapping each pixel within each sub-array to a different output direction or hogel beam. The mapping may be accomplished, for example, with different types of optics, such as refractive optics, diffractive optics, reflective optics, metamaterials, volume holographic optics, nano-optics, etc. or combinations of those. The optics may be configured to map pixels in different locations on the 2D light modulator to different hogel beams.

In other embodiments, the hogel display may be implemented using holographic hogels that are written—and re-written—in a re-writable recording medium, such as a photorefractive photopolymer. See, for example, Zebra Imaging U.S. Pat. Nos. 7,227,674 and 6,859,293, which is hereby incorporated by reference herein in its entirety. A recording "head" converts hogel data into a beam of modulated coherent light, which is focused to one hogel location of the recording medium, where it interferes with a coherent reference beam. The result is a recorded hogel, capable of diffracting a third beam—illumination beam—as specified by the hogel data for that particular hogel. The head (or heads) can be rapidly positioned relative to the recording medium, to scan through the lateral extent of the hologram, writing the appropriate hogel at each location. This process may be repeated for each update. A recording head may require a separate, leading erasure head to neutralize the hogel prior to an update. These heads may incorporate temperature modulating elements or separate flood laser sources to achieve timely erasure prior to recording. In some embodiments, the heads may be compact and capable of being integrated with the illumination system in order to facilitate simultaneous display and update.

In yet other embodiments, the hogel display may be implemented by computing holographic fringe patterns that are then used by (for example) a light modulation system to diffract light. In this embodiment, the fringes may be computed (not generated through physical interference) and are fed to a light modulation subsystem, which modulates a beam of light with these fringes, causing the light to diffract into specific directions as specified by the hogel data. An array of pixels from a traditional, 2D light modulator may be used in the light modulation subsystem to convert the fringe data into an optically modulated light field. For example, please see M. Lucente, "Interactive holographic displays: the first 10 years," book chapter in *Holography. The first 50 years*, (Springer Series in Optical Sciences Vol. 78), Springer-Verlag (Berlin), editor J.-M. Fournier, ISBN #3540670750, 2004 February. The above-referenced application is hereby incorporated by reference herein in its entirety.

In yet other embodiments, the hogel display may be implemented using subelements. See, for example, G. P. Nordin, M. W. Jones, J. H. Kulick, R. G. Lindquist, and S. T. Kowel, "A 3-D Display Utilizing a Diffractive Optical Element and an Active Matrix Liquid Crystal Display," Opt. Eng. 35(12), pp. 3404-3412 (1996); or J. H. Kulick, G. P. Nordin, A. Parker, S. T. Kowel, R. G. Lindquist, M. Jones, and P. Nasiatka, "Partial Pixels: A Three-Dimensional Diffractive Display Architecture," J. Opt. Soc. Am. A, 12(1), pp. 73-83 (1995); or United States Patent Application Publication No. 2007/0121028, "Three-dimensional autostereoscopic display and method for reducing crosstalk in three-dimensional displays and in other similar electro-optical devices," by Zoran Mihajlovic. The above-referenced applications are hereby incorporated by reference herein in their entirety. In this embodiment, the 3D display is based on a "partial pixel" (or "partial hogel") 3D display architecture, in which each "pixel" (more akin to a hogel) is subdivided into partial pixels, which in turn can be implemented as individual diffraction gratings. The 3D display exhibits a 3D image with one-dimensional parallax. The primary optical components of the 3D display are an active-matrix liquid crystal light modulator and a diffractive optical element (DOE). The DOEs diffract light from a given pixel into a predetermined direction. In this manner, each partial pixel controls the amount of light emitted by the 3D display in a particular direction at (or near) a particular hogel location. It should be noted that systems other than the 3D display systems described above may be used with the calibration methods and systems described here.

In some embodiments, calibration methods may be used to improve the quality of the 3D images generated by the hogel display. One or more light sensors, such as one or more cameras, may be used to detect light emerging from the hogel display. A combination of different types of light sensors placed in one or more positions may also be used. The results from the detection of light from the hogel display may then be analyzed, and the data and parameters used in generating the hogel data for the hogel display may be adjusted at one or more stages in the data processing accordingly to improve the quality of the 3D image. The calibration process may be applied once, may be applied multiple times, or may be applied iteratively in real time.

It should be noted that, in some embodiments, the generation of the hogel light field and the detection of the hogel light field are performed substantially concurrently.

In some embodiments, the light sensor may be first calibrated. For example, the light sensor may be calibrated in the amounts of light intensity and colors being detected by the sensor.

The one or more light sensors may directly capture light emitted by the 3D display system. Alternately, a scattering target (e.g., small white surface) or mirror may be used, with the one or more light sensors mounted such that light scattered from the target and/or mirror may be collected by the one or more light sensors.

Calibration may be used, for example, to compensate for various imprecisions such as physical imperfections, variations, etc. in one or more of the components of the 3D display. Depending on the technology used to implement the 3D display, imperfections or variations may exist in the various optics, in the placement of the optics relative to the spatial modulator and relative each other, non-uniformities in the spatial light modulator (in intensity, efficiency, optical power, for example), undesired variations in the electronics or data processing units, etc.

In some embodiments, the hogel display may be designed with a spatial array of light modulation elements under an array of optical elements including uniformly spaced lenslets as described above. The data may be generated to include numerical calibrations to account for misalignments and non-uniformities in these display components. The generation algorithm may utilize a calibration table, populated with calibration factors determined during the calibration detection process. Once calibrated, the data generation algorithm (the algorithm to convert 3D data to hogel data) may utilize the calibration table (in real time in some embodiments) to generate data pre-adapted to variations in the display optics and other imperfections/variations. The desired result may be a more predictable mapping between data and emitted light—i.e., the locations, directions, and intensities of emitted light—and thus a higher quality 3D image. The process may also calibrate the 3D display to account for non-uniform intensity responses in each color, allowing the 3D display system to produce a uniform intensity and color.

In addition, calibration may be used to align the generated 3D image with one or more external objects such another 3D display, a 2D display, one or more physical objects, a reference grid, etc. The 3D image may be translated in 3D and/or stretched 3D in order for the image to be accordingly aligned.

Generally, calibrations and adjustments to the data may be applied at different stages in the data stream, including overall calibrations for the 3D display, calibrations for each hogel display element, calibrations for each color, etc. In some embodiments, calibration data may be generated during the calibration detection process and stored in a calibration table. The calibration table may be applied at different stages of the data processing to improve the quality of the image generated by the hogel display. For example, the calibration table may be applied prior to the generation of the hogel data from the 3D data, or the calibration table may be applied during the generation of the hogel data from the 3D data, or the calibration table may be applied to the hogel data after the hogel data has been generated from the 3D data.

One or more external light sensors (such as digital still cameras, video cameras, photodetectors, etc.) may be used to detect variations and/or unexpected results from the 3D display. The data from the detection may then be used to generate calibration data with which to populate the calibration table. In some embodiments, the derived calibrations may be combined with other corrections such as corrections to compensate for known optical limitations and corrections to compensate for known or measured geometric misalignments. In some embodiments, the determination and application of the calibrations may be performed using existing computational software and hardware of by the hogel display. In other embodiments, additional computational software and hardware may be used. In yet other embodiments, additional as well as existing computational software and hardware may be used.

In some embodiments, pre-determined calibration patterns may be displayed by the hogel display and subsequently analyzed to determine appropriate calibrations. The calibration may be performed for all the hogels of the 3D display at the same time, or the calibration may be performed piecemeal, e.g., by calibrating one or more portions of the 3D display at a time. The light sensor may be linked to the relevant computer system(s) through a digitizer or frame grabber, in some embodiments. The calibration may run on a computer system, generating the correction table for later use and then may be removed during normal use of the 3D display.

In some embodiments, one or more of the spatial positions of the hogels may be calibrated. As discussed above, undesired variations in the optics, etc. may cause the hogels not to emit light from expected positions (a regular grid, for example) and thus cause undesirable results. In some embodiments, after the locations of the hogels have been determined, the location information may be used when generating subsequent hogel data in order to generate a higher quality 3D image.

In some embodiments, the calibration detection process may illuminate one or more hogels and the light may be detected using one or more light sensors such as a camera. The location of the hogel may be then determined by determining the "center" of the light received from the hogel through an averaging process or a search process, for example. The new location may now be noted and used when computing the hogel data. The hogel data may now be generated, for example, using the locations determined by the calibration detection process. Numerous other methods may also be used to determine the locations of the hogels.

In other embodiments, instead of computing hogel data with respect to the determined locations of the hogels, the hogels may be physically adjusted to (or towards) the hogels' expected locations, assuming that the hogel display technology permits such adjustment. In one embodiment, this may be accomplished, for example, by appropriately repositioning optics that may be used as part of the display. In other embodiments, a combination of physical and data adjustments may be used.

In some embodiments, the directions in which light emerges from the one or more of hogels (the hogel beams) may also be calibrated. Again, variations in the optics and/or imprecisions in the placement of the optics (or other equipment that may be used in a particular implementation) may cause light emerging from each hogel to not emerge in the desired direction or directions. The directions in which light emerges from the hogel may, in some embodiments, be designated using two angular coordinates such as $\phi$ and $\theta$, similar to the way locations may be designated on the surface of a sphere.

To calibrate the direction in which light emerges from a hogel, each direction for a particular hogel may be illuminated in sequence and the light from each hogel beam may be detected using the light sensor. A detected direction may then be used to calculate calibration data which is then recorded in the calibration data set. This type of detection and calibration may range in complexity, from simple zero- or first-order calibrations, to higher-order polynomial representations, to an intricate transformation or projection. In addition, a complete mapping from one angular value to another may be used in order to more accurately calibrate the 3D display. It should be noted that the calibrations/corrections for both $\phi$ and $\theta$ may be dependent on both $\phi$ and $\theta$.

In some embodiments, one or more of the hogel's intensity and color may also be calibrated. In some embodiments, the overall intensity of the 3D display may be calibrated, for example, by turning on all the hogels and measuring the intensity generated by the hogel display using the light sensor. Individual hogels and hogel elements may be calibrated by selectively illuminating individual hogels and hogel elements. In addition, if the 3D display uses the primary colors red, green, and blue to display color hues, each of the three primary colors may be individually calibrated. Other attributes of each color may also be calibrated such as intensity response (output intensity versus hogel data values) and other color/intensity properties.

It should be noted that many of the techniques described here may be combined. For example, the same measurement may be used to calibrate the position of hogels, the angle in which light emerges from each hogel, and the color and intensity generated by the hogel beams. It should also be noted that the processes described here may be used in any order, may be used multiple times, may be used iteratively, and may also be applied in real-time while the 3D display is in operation.

It should also be noted that calibrations may be performed to account for variations in one set of responses as a function of other variables. For example, the uncalibrated intensity response of a given hogel in the 3D display may vary as a function of directions $\phi$ and $\theta$. Calibration can detect this variation, in particular through the use of multiple sensors, and include in the calibration table a intensity-response calibration that is a function of $\phi$ and $\theta$.

As part of the calibration process, one or more calibration patterns may be used. A calibration pattern illuminates specific hogels and/or hogel beams for the purpose of detecting and calibrating specific properties of the hogel display. The calibration patterns may be combined with one or more types of searches to determine appropriate calibration parameters. A binary search may be used, for example, to determine what sample of hogel data most effectively sends light in a particular output direction. The search may begin with broad guesses and measurements, followed by more refinement, e.g., a 2D binary search, or a more sophisticated modified version of the Newton-Raphson method of (iterative) approximation. It should also be noted that previous determinations from the calibration operations may be used in subsequent calibration operations. For example, the determined location of a hogel may be used as an initial guess when the determining the location of a neighboring hogel.

An example of part of the calibration routine may be: for a given element and primary color, the algorithm first guesses which calibration pattern (sent to the light modulator subsystem of the 3D display) will cause light to be emitted from a specific element to the sensor. The sensor may be then read and normalized (i.e., divide the sensor reading by the fraction of total dynamic range represented by the present test data pattern). This normalized value is recorded for subsequent comparisons. When the searching routine finds the calibration pattern that generates the optimal light output from the 3D display, the routine stores this information. Once all hogel display elements have been evaluated, a calibration table is derived from the stored knowledge of the optimal calibration patterns.

FIG. 1 is a block diagram illustrating a system for calibrating a hogel display, in accordance with some embodiments.

Generally, hogel display 125 includes processor 130, which is coupled to memory unit 135 and hogel light modulator 115. In addition, light output from the hogel display 125 is coupled to light sensor 110. Hogel display 125 is configured to display 3D images that are represented in hogel data. In some embodiments, hogel display 125 is configured to receive 3D data in different formats and to convert the 3D data to hogel data. The hogel data may then be provided to hogel light modulator 115, which is configured to convert the hogel data into a hogel light field representation of the hogel data array. Light sensor 110 is configured to detect light emitted by hogel light modulator 115, in some embodiments, for the purpose of calibrating hogel display 125.

In some embodiments, hogel light modulator 115 is configured to convert hogel data into modulated light fields. That is, hogel light modulator 115 is configured to generate light that is modulated as a function of both spatial location and output light direction, to generate hogel beams (or a hogel light field) such as hogel beams 120. Multiple hogel beams emerge from multiple locations from hogel light modulator 115 to enable hogel display 125 to display 3D images.

Light sensor 110 is configured to detect light generated by hogel light modulator 115 for the purpose of calibrating hogel display 125. In some embodiments, the position of light sensor 110 may first be determined relative to hogel display 125 as well as the boundaries of the hogel display relative to the light sensor 110. The relative position of light sensor and the boundaries of the hogel display may be used to more accurately determine the calibration parameters.

In some embodiments, the positions of the hogels on the surface of 3D display 125 may be detected during the detection stage of the calibration. Different calibration patterns (patterns that light different hogel beams on different hogels) may be used on hogel display 125 and then detected by light sensor in order to determine the positions of the hogels. For example, all the hogel beams may be turned on for each hogel and then the average location of the light intensity may be computed in order to determine the actual location of the hogel.

In some embodiments, the directions of light emerging from each hogel may be calibrated. Again, different calibration patterns may be used in order to calibrate the hogel beams with respect to the direction of emitted light.

In some embodiments, the intensity and color of one or more of the hogel beams may be calibrated. In embodiments where the 3D display uses the three primary colors red, green, and blue to generate color, each of the three primary colors may be calibrated in terms of intensity as well as general response mapping (e.g., gamma correction) if necessary. Again, different calibration patterns may be used in order to calibrate intensities for each hogel and even each hogel beam.

After the appropriate calibrations have been determined, calibration parameters may be computed. In some embodiments, the calibration parameters may be arranged in the form of one or more calibration tables. The calibration parameters may be applied to one or more stages of the data processing system, which extends from control and distribution of 3D data to processing of hogel data. That is, the calibration parameters may be applied to the 3D data received by the hogel display before the computation of the hogel data, or the calibration parameters may be applied during the computation of the hogel data from the 3D data, or the calibration parameters may be applied to the hogel data after the hogel data has been computed.

In some embodiments, calibrations may be performed multiple times in order to better improve the quality of hogel display 125 as well as iteratively and in real time.

Figure 2:
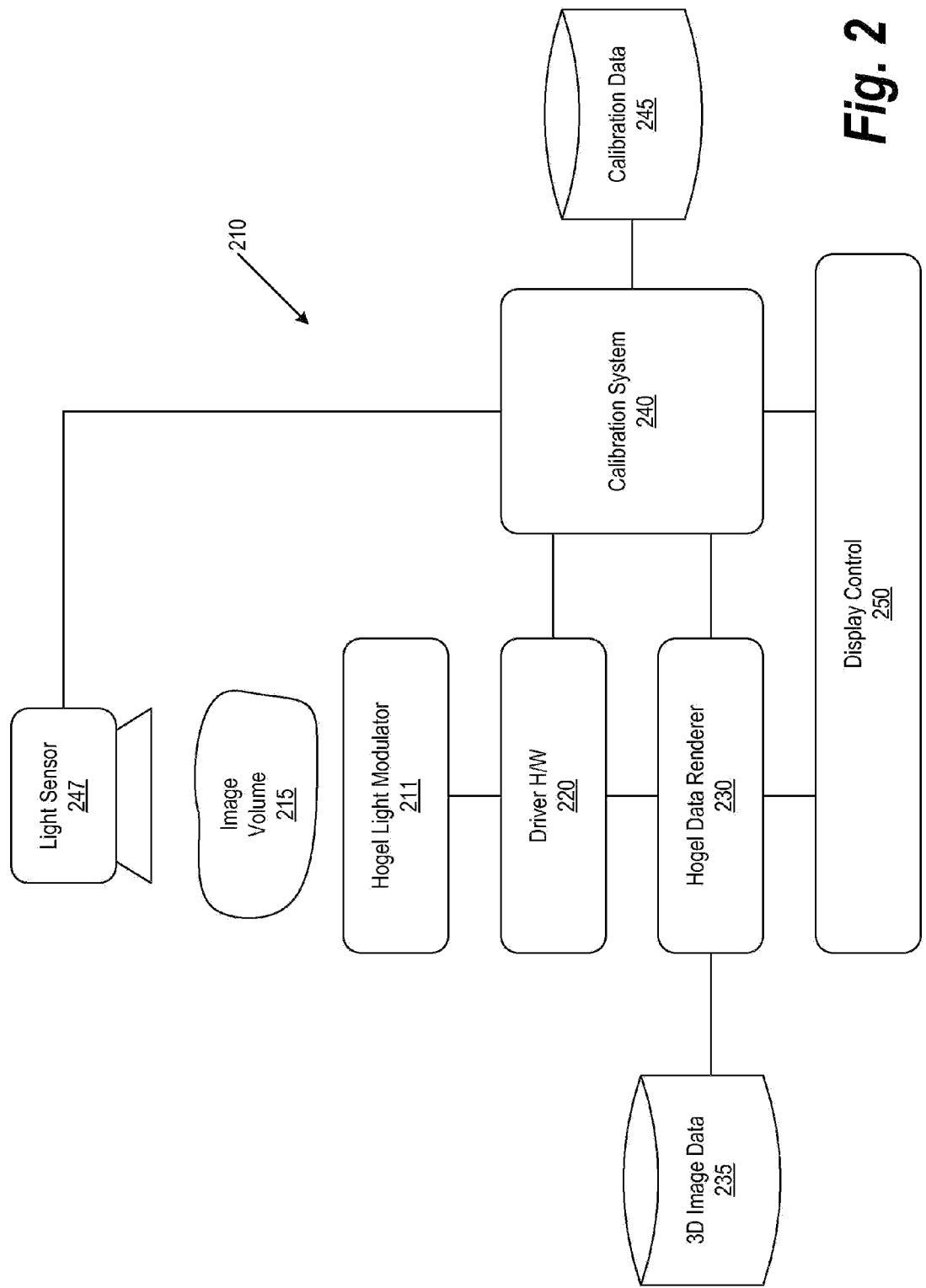
FIG. 2 is a block diagram illustrating an alternative system for calibrating a hogel display, in accordance with some embodiments.

FIG. 2 is a block diagram illustrating an alternative system for calibrating a hogel display, in accordance with some embodiments.

System 210 is an example of a dynamic, auto-viewable hogel display that is to be calibrated and subsequently operated in a calibrated fashion, generating high-quality 3D images. Various system components are described below, and numerous variations on this system design (including additional elements, excluding certain illustrated elements, etc.) are contemplated. 3D display system 210 includes one or more hogel light modulators 211 configured to produce dynamic auto-viewable images illustrated by image volume 215. It should be noted that image volume 215 could extend below the hogel plane of hogel light modulator 211.

In this embodiment, the modules use light modulators to present arrays of hogel data. In general, different types of emissive or non-emissive light modulators may be used as part of hogel light modulator 211, such as those based on electroluminescent displays, field emission displays, plasma light modulators, vacuum fluorescent displays, carbon-nanotube light modulators, polymeric light modulators such as organic light emitting diode (OLED) displays, electro-optic (e.g., liquid-crystal) transmissive light modulators; micro-electro-mechanical (e.g., micromirror devices, including the TI DLP) light modulators; electro-optic reflective (e.g., liquid crystal on silicon, (LCoS)) light modulators; magneto-optic light modulators; acousto-optic light modulators; electrophoretic; optics based on metamaterials; and optically addressed devices, etc. In addition, a number of other types of modulation devices may be used, some generally referred to as spatial light modulators (SLMs).

Each of the light modulator devices employed in hogel light modulators 211 is driven by one or more driver hardware 220. Driver hardware 220 may include specialized graphics processing hardware such as a graphics processing unit (GPU), frame buffers, high speed memory, and hardware to provide requisite data signals (e.g., fast bus protocols, data manager protocols, network protocols, and other signal formats) to the light modulators. Driver hardware 220 provides suitably rapid light modulator refresh, thereby allowing the overall 3D display to be dynamic. Driver hardware 220 may execute various types of software, including specialized drivers, as appropriate.

Hogel renderer 230 generates hogel data for use by hogel light modulators 211 using 3D image data 235. In one implementation, 3D image data 235 may include virtual reality peripheral network (VRPN) data, which employs some device independence and network transparency for interfacing with peripheral devices in a 3D display environment. In addition, or instead, 3D image data 235 can use live-capture data or distributed data capture, such as data from a number of detectors carried by a platoon of observers. Depending on the complexity of the source data, the particular 3D display modules, the desired level of dynamic display, and the level of interaction with the display, various different hogel rendering techniques can be used. Hogel data can be rendered in real-time (or near-real-time), pre-rendered for later use for 3D image generation, or some combination of the two. For example, certain display modules in the overall system or portions of the overall display volume can utilize real-time hogel rendering (providing maximum display updateability), while other display modules or portions of the image volume use pre-rendered hogel data.

Hogel renderer 230 and 3D image data 235 can include various different types of hardware (e.g., graphics cards, GPUs, graphics workstations, rendering clusters, dedicated ray tracers, etc.), software, and image data as will be understood by those skilled in the art. Moreover, some or all of the hardware and software of hogel renderer 230 can be integrated with driver hardware 220 as desired.

System 210 also includes elements for calibrating the dynamic auto-viewable display modules, including calibration system 240 (typically including a computer system executing one or more calibration methods), calibration data 245 (typically derived from the calibration system operation using one or more calibration patterns) and one or more detectors 247 used to determine actual images, light intensities, etc. produced by hogel light modulators 211 during the calibration process. The resulting information can be used by one or more of driver hardware 220, hogel renderer 230, and display control 250 to adjust the images displayed by hogel light modulators 211.

Figure 3:
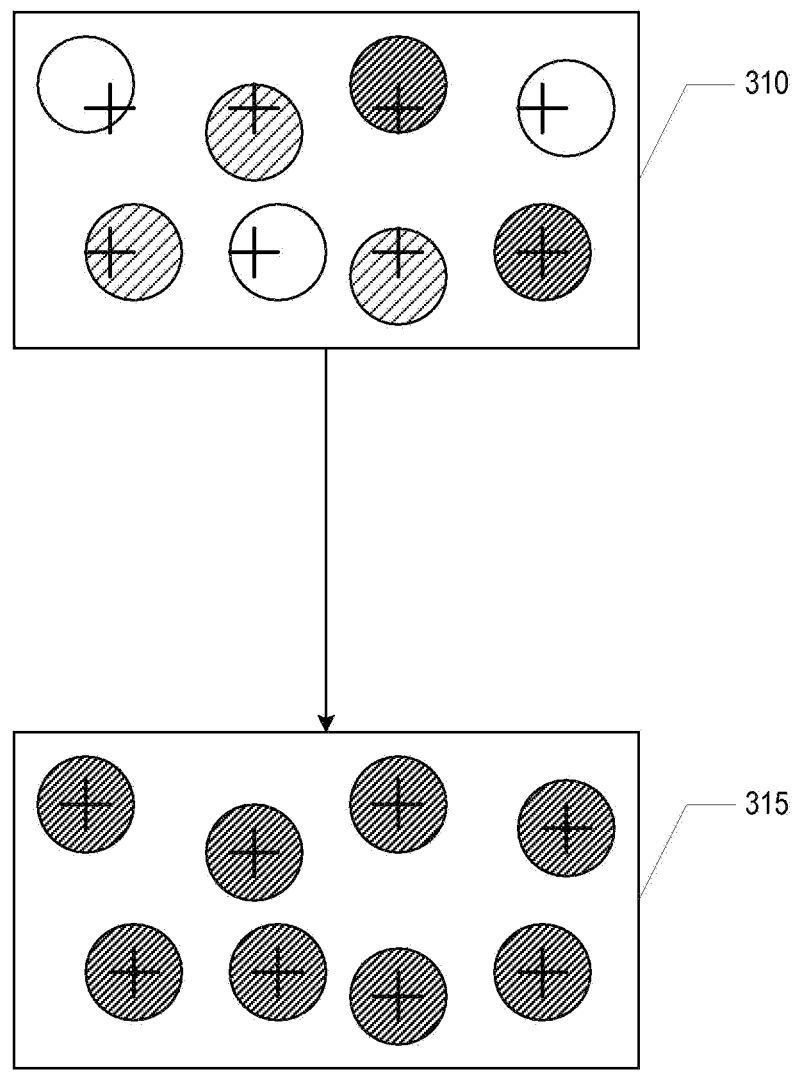
FIG. 3 is a diagram illustrating the appearance of hogels on a hogel display before and after calibration, in accordance with some embodiments.

FIG. 3 is a diagram illustrating the appearance of hogels on a hogel display before and after calibration, in accordance with some embodiments.

In some embodiments, the crosses may represent the expected center positions in which hogels may appear. As may be seen from snapshot 310, the expectation may be that the hogels form a regular grid, which is indicated by the positions of the crosses.

Due to various imperfections/variations in the light modulator (optics, electronics, etc.), however, the hogels may have actual positions as indicated by the circles. In addition, the hogels may not have uniform intensity responses, e.g., do not have uniform output intensity when instructed to do so by a specific calibration pattern. In the figure, intensity is indicated by the density of the cross hatches. That is, the brightest intensities are indicated by the denser cross hatches, the medium intensities by the medium cross hatches, and the least bright intensities by no cross hatches.

In some embodiments, information detected and collected from snapshot 310, such as the observed position of each hogel beam and the intensity observed for each hogel beam, may be used in one or more calibration tables. In some embodiments, it may not be necessary to "move" the hogel positions to the expected, regular grid positions. Instead, the actual positions of the hogels may be provided via the calibration table to the hogel data algorithms. Accordingly, when the calibration table is applied during image generation, the hogel data may be generated from the 3D data at the new, actual hogel positions.

In addition, the intensity response information may also be stored in the calibration table. This calibration data can be provided to the hogel data algorithms and the hogel data adjusted such that all the hogels appear to have substantially the same intensity—for the same hogel data value.

In some embodiments, snapshot 315 may indicate the detected hogels after calibration has been performed. As illustrated by snapshot 315, when the calibration table is applied during 3D image generation, the hogel data may be generated with the actual hogel locations provided to the hogel-generating process as indicated by the new positions of the crosses. The actual positions, indicated by the circles, now substantially are matched by the positions used during generation of hogel data. Furthermore, the intensity response of light observed for each hogel is now substantially the same.

Figure 4:
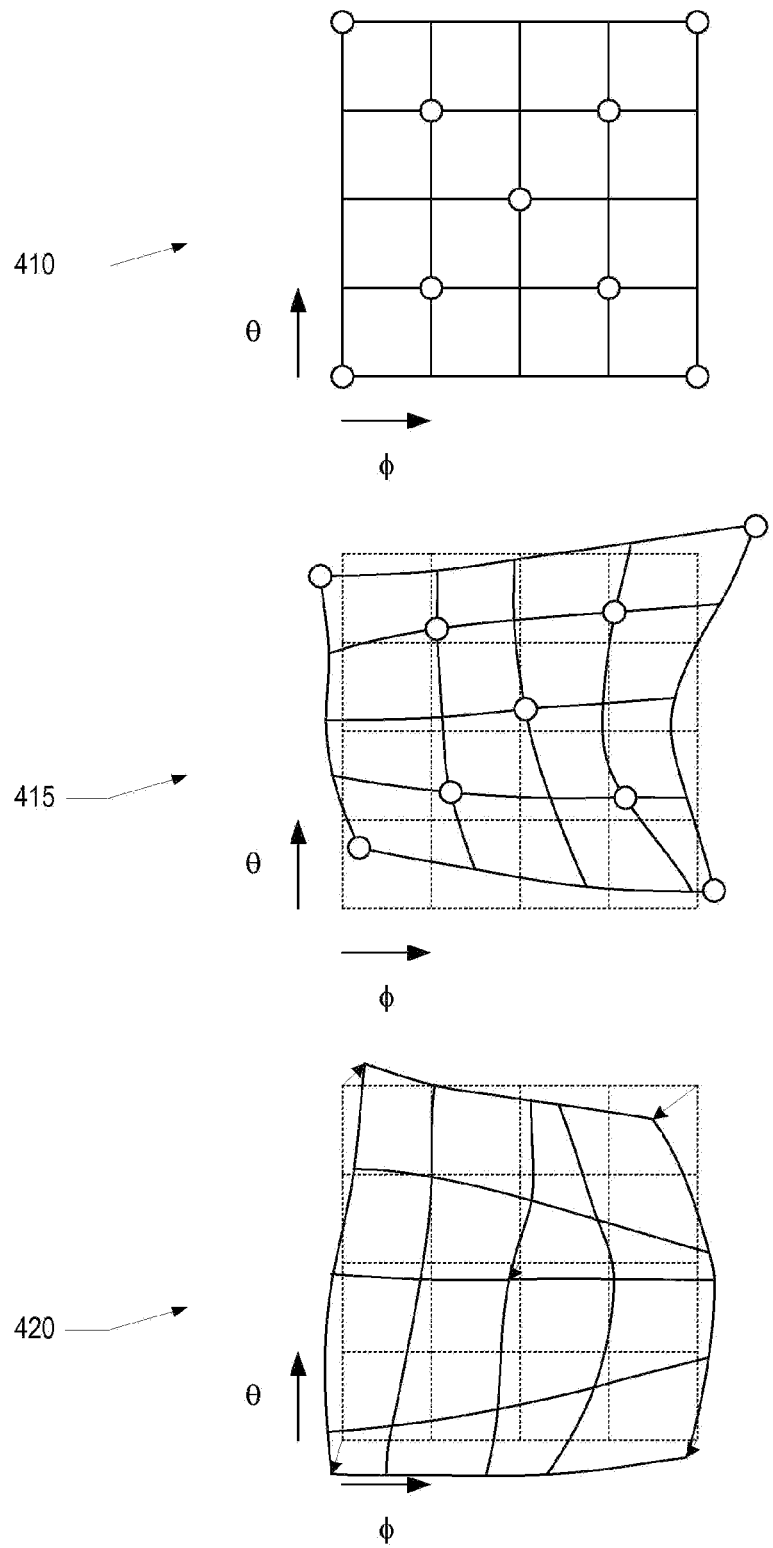
FIG. 4 is a diagram illustrating the effect of calibration on hogel beams, in accordance with some embodiments.

FIG. 4 is a diagram illustrating the effect of calibration on hogel beams, in accordance with some embodiments.

In some embodiments, illustration 410 may indicate expected angular output directions for hogel beams as observed for a particular hogel in terms of angular coordinates $\phi$ and $\theta$. In some embodiments, one or more light sensors may be used to detect the angular output directions of the hogel beams, shown in 410 as nine circles along the two diagonals of the grid shown in the figure. The circles represent the expected angular output directions for the hogel beams along the two diagonals, which are expected to fall on the regular grid also shown in the figure. As described in this example, calibration along the diagonals is performed, but it should be noted, that calibration for all hogel beams or other subsets of hogel beams may be performed. It should also be noted that the expected angular output directions for the hogel beams may not necessarily be a regular grid. Other configurations include nonlinear or anisotropic spacings.

Illustration 415 shows the angular output directions of the hogel beams along the diagonals as the angular output directions may be detected by one or more light sensors (in some embodiments, placed in one or more locations). The angular output directions of the hogel beams may be not be at the expected grid coordinates due to variations in the optics, the spatial modulators, etc., which is indicated by the transformed grid overlaid on the regular grid. In some embodiments, a transformation matrix may be then determined so that the hogel beams emerge at angles that are substantially the same as the expected, regular grid shown in illustration 410.

The transformation may involve a simple 0-th order transformation, which involves adding the same constant to all the coordinates, or the transformation may involve higher-order transformations. In some embodiments a complete mapping for each coordinate may be used. For example, a table of values may be used mapping each coordinate to a different coordinate. In some cases, calibration results from the use of angular calibration data including zero-order remapping in both directions plus first- and second-order radial remapping.

Illustration 420 shows the directions of hogel beams as the hogel data may be remapped using the calibration table during 3D imaging on the hogel display. Hogel data generation uses calibration data from the calibration table to remap hogel data in anticipation of known variations in directional behaviors of the hogel beams.

In some embodiments, circular symmetry may exist in the amounts by which the coordinates are off. In such embodiments, the transformations may be adjusted so that they are dependent on the radial distance from the center.

Calibration data can be applied using 3D projections, e.g., in the GPU. For example, the angular remapping data stored in the calibration table can be used to perform angular calibration on hogel data during the conversion of 3D model data into hogel data. Using, e.g., the texture mapping function of a GPU, hogel data can be mapped from an initial coordinate space UV to the desired coordinates U'V', which are derived from the calibration detection stage, and represent, in some embodiments, the opposite of the real detected behavior of the 3D display system.

Figure 5:
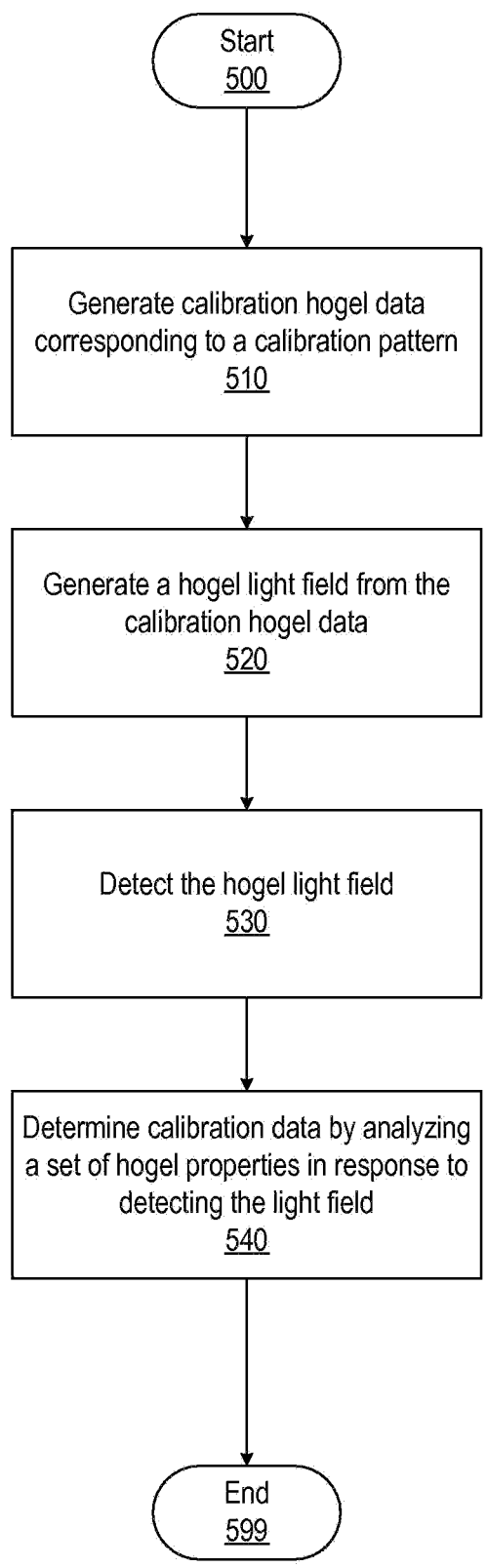
FIG. 5 is a flow diagram illustrating a method for calibrating a hogel display, in accordance with some embodiments.

FIG. 5 is a flow diagram illustrating a method for calibrating a hogel display, in accordance with some embodiments. It should be noted that the methods described here, in some embodiments, may be performed by the system shown in FIG. 1.

Processing begins at 500 where, at block 510, calibration hogel data corresponding to a calibration pattern is generated. At block 520, a hogel light field is generated from the calibration hogel data. At block 530, the hogel light field is generated, and at block 540, calibration data is determined by analyzing a set of hogel properties in response to detecting the light field. Processing subsequently ends at 599.

Figure 6:
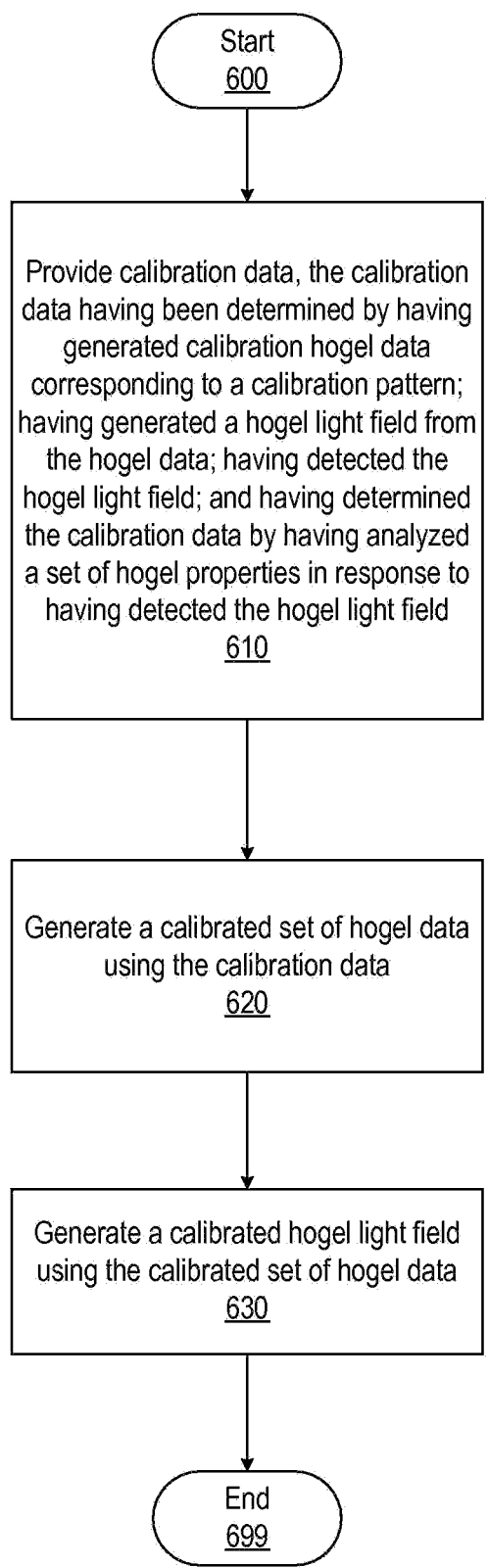
FIG. 6 is a flow diagram illustrating a method for applying calibration data to a hogel display, in accordance with some embodiments.

FIG. 6 is a flow diagram illustrating a method for applying calibration data to a hogel display, in accordance with some embodiments. It should be noted that the methods described here, in some embodiments, may be performed by the system shown in FIG. 1.

Processing begins at 600 where, at block 610, calibration data is provided, the calibration data having been determined by having generated calibration hogel data corresponding to a calibration pattern; having generated a hogel light field from the hogel data; having detected the hogel light field; and having determined the calibration data by having analyzed a set of hogel properties in response to having detected the hogel light field. At block 520, a calibrated set of hogel data is generated using the calibration data, at block 530, a calibrated hogel light field is generated using the calibrated set of hogel data. Processing subsequently ends at 699.

Figure 7:
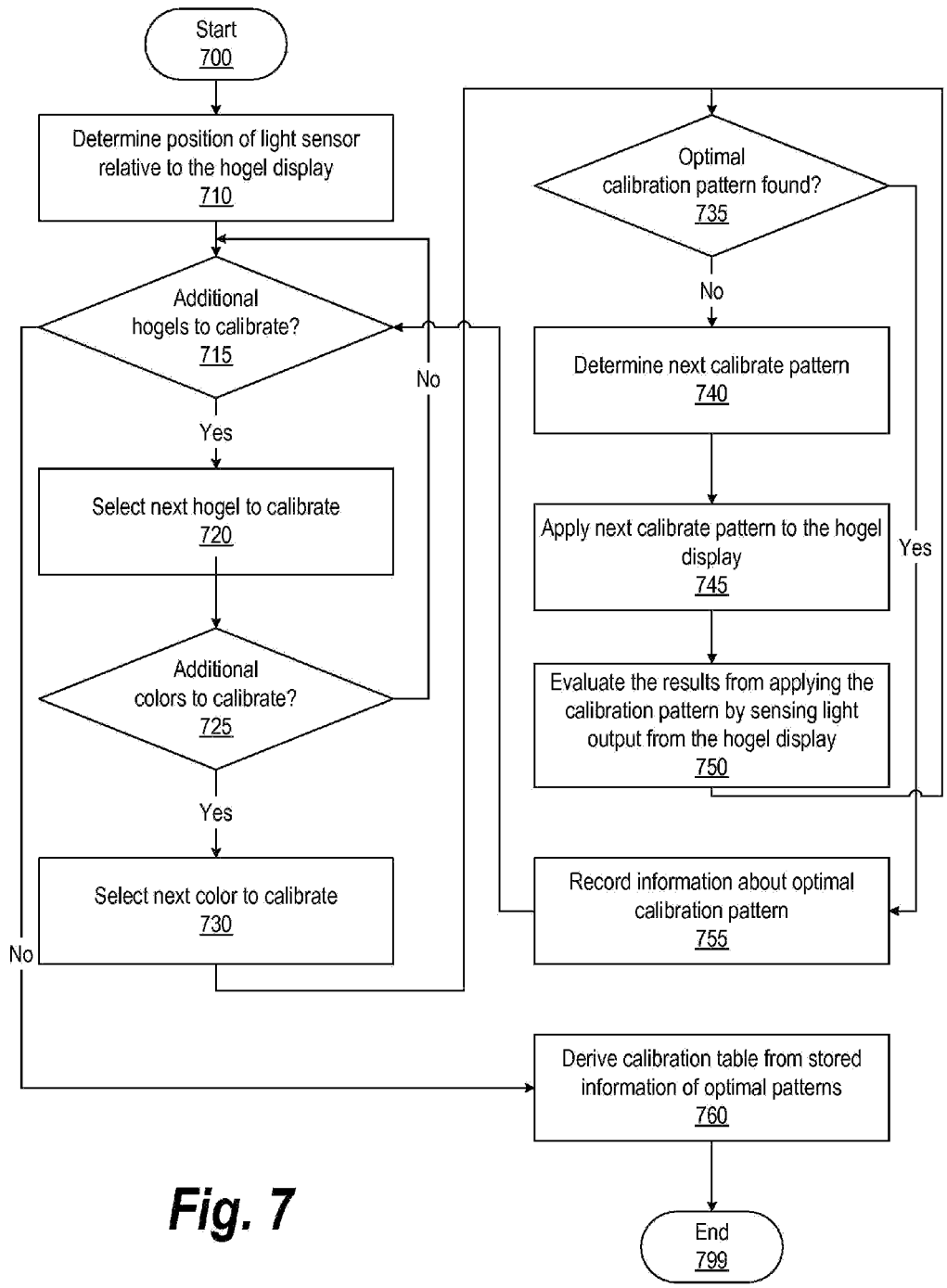
FIG. 7 is a flow diagram illustrating an alternative method for calibrating a hogel display, in accordance with some embodiments.

FIG. 7 is a flow diagram illustrating an alternative method for calibrating a hogel display, in accordance with some embodiments. It should be noted that the methods described here, in some embodiments, may be performed by the system shown in FIG. 1.

Processing begins at 700 where, at block 710, a position of one or more light sensors is determined relative to the hogel display. The one or more light sensors may be used to detect light emerging from a hogel display for calibrating the hogel display. In some embodiments, one hogel may be calibrated at a time. In other embodiments, a group of hogels or all the hogels may be calibrated in parallel.

At decision 715, a determination is made as to whether additional hogels requiring calibration remain. If no additional hogels requiring calibration remain, decision 715 branches to the "no" branch where processing continues at block 760. On the other hand, if additional hogels requiring calibration remain, decision 715 branches to the "yes" branch where, at block 720, the next hogel to be calibrated is selected. It should be noted that this process could apply to cases where hogels are detected by the one or more light sensors either one at a time or a group at a time.

A determination is then made as to whether additional colors to be calibrated remain at decision 725. In embodiments where red, green, and blue colors are used by the display, each of the colors in each hogel, for example, may be separately calibrated. If no additional colors remain to be calibrated, decision 725 branches to the "no" branch where processing returns to decision 715. On the other hand, if additional colors remain to be calibrated, decision 725 branches to the "yes" branch where processing continues at block 730 where the next color to be calibrated is selected.

Processing then continues at decision 735 where a determination is made as to whether an optimal calibration has been found. An optimal calibration pattern may depend on the type of calibration being performed. If an optimal calibration pattern has been found, decision 735 branches to the "yes" branch where, at block 755, information about the optimal calibration pattern for that color and hogel is recorded. Subsequently, processing returns to decision 710. On the other hand, if an optimal calibration pattern has not been found, decision 735 branches to the "no" branch where processing continues at block 740.

At block 740, the next calibration is determined. At block 745, the next calibration test pattern is applied to the hogel being calibrated, and at block 750, the results from applying the new calibration pattern are evaluated by sensing light output from the 3D display using the light sensor. Processing subsequently returns to decision 735 in order to again determine whether the optimal calibration pattern has been found.

Figure 8:
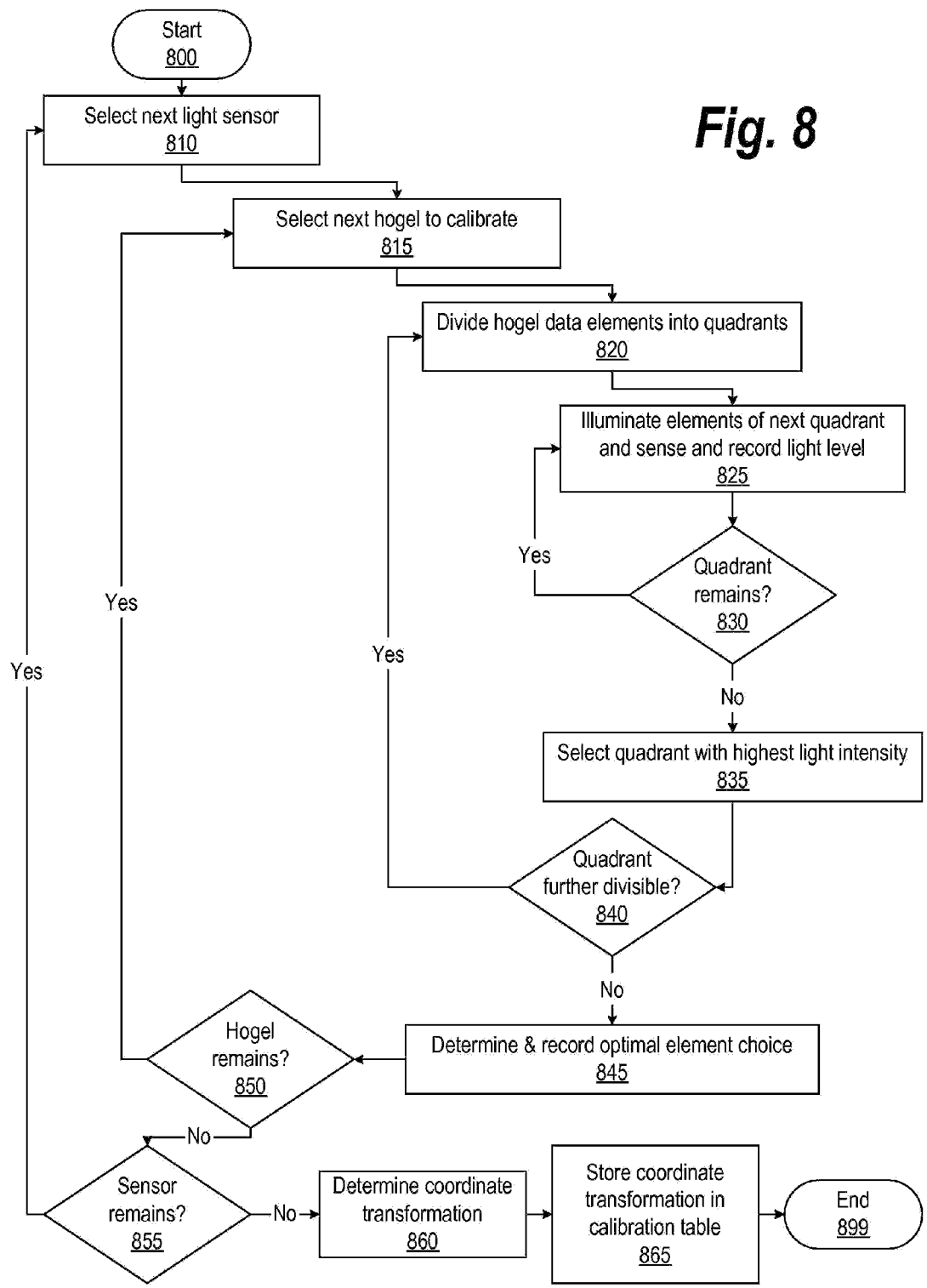
FIG. 8 is a flow diagram illustrating a method for angular calibration of a hogel display, in accordance with some embodiments.

FIG. 8 is a flow diagram illustrating a method for angular calibration of a hogel display, in accordance with some embodiments. It should be noted that the methods described here, in some embodiments, may be performed by the system shown in FIG. 1.

In some embodiments, the method described here may be used to determine the angular directions with which hogel beams emerge from one or more hogels of a hogel display. Other methods may also be used in order to make such determinations.

Processing begins at 800 whereupon, at block 810, the next light sensor is selected. In some embodiments, one or more light sensors may be used in one or more positions and orientations in order to detect light emerging from the hogel display being calibrated.

At block 815, the next hogel to be calibrated is selected, and at block 820, the hogel data elements are divided into quadrants. In some embodiments, the data elements may correspond to the hogel beams emerging from each hogel. In other embodiments, other search techniques may be used to determine the angular output directions of hogel beams other than dividing hogel data elements into quadrants.

At block 825, one of the four quadrants is chosen and the elements (for example, the hogel beams) associated with that quadrant are illuminated and the intensity of the generated light is detected by the one or more light sensors. In one embodiment, determining which quadrant results in the highest detected intensity is an indication as to which quadrant contains the data element (hogel beam) sending light in that particular direction.

At decision 830, a determination is made as to whether another quadrant remains out of the four original quadrants. If additional quadrants remain, decision 830 branches to the "yes" branch where processing returns to block 825. At block 825, the elements of the next remaining quadrant are illuminated in order to detect the light intensity resulting from that quadrant.

On the other hand, if no additional quadrants remain, decision 830 branches to the "no" branch where, at block 835, the quadrant that resulted in the highest detected light intensity is selected.

A determination is then made, at decision 840, as to whether the quadrant is further divisible. In some embodiments, division of the quadrant may continue until a single data element (hogel beam) is selected and its angular direction is determined and recorded for calibration purposes. If the quadrant is further divisible, decision 840 branches to the "yes" branch whereupon processing returns to block 820 for the remaining hogel data elements to be further divided into quadrants.

On the other hand, if the quadrant is not further divisible, decision 840 branches to the "no" branch where, at block 845, the result of the quadrant search, i.e., the optimal choice of data elements as determined by the one or more light sensors is recorded.

A determination is then made, at decision 850, as to whether additional hogels remain. If additional hogels remain, decision 850 branches to the "yes" branch and processing returns to block 815 where the next hogel to be calibrated is selected.

On the other hand, if no additional hogels to be calibrated remain, decision 850 branches to the "no" branch where, at decision 855, another determination is made as to whether additional light sensors remain. If additional light sensors remain, decision 855 branches to the "yes" branch and processing returns to block 810 where the next light sensor is selected.

If no additional light sensors remain, decision 855 branches to the "no" branch where, at block 860, an angular coordinate transformation is determined using the detected/determined directions for the one or more hogel data elements. Depending on the accuracy required, transformations of different orders may be used as described above.

At block 860, the determined angular coordinate transformation is stored in a calibration table. The calibration may be applied to subsequent conversions of 3D data to hogel data that is used by the hogel display when displaying a 3D image for, among other reasons, improving the quality of the image.

Processing subsequently ends at 899.

Those of skill will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Those of skill in the art may implement the described functionality in varying ways for each particular application, but such implementation decisions should not be interpreted as causing a departure from the scope of the present invention.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The benefits and advantages that may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:
1. A system comprising:
one or more processors;
one or more memory units coupled to the one or more processors;
one or more light sensors coupled to the one or more processors; and
a hogel light modulator coupled to the one or more processors;
wherein the one or more processors are configured to generate calibration hogel data corresponding to a calibration pattern, wherein the calibration hogel data comprises expected hogel positions of expected hogels and expected directions of expected hogel beams emerging from the expected hogels;

wherein the hogel light modulator is configured to generate a hogel light field based at least in part on the calibration hogel data;

wherein the one or more light sensors are configured to detecting the hogel light field;

wherein the one or more processors are configured to determine, in response to the detecting the hogel light field, at least one of: detected hogel positions of detected hogels, and detected directions of detected hogel beams emerging from the detected hogels; and wherein the one or more processors are configured to determine calibration data for the hogel light modulator by comparing at least one of: the detected and the expected hogel positions, and the detected and the expected directions of the detected hogel beams and the expected hogel beams respectively.

2. The system of claim 1, where the system is further configured to apply the calibration data to other sets of hogel data thereby causing the set of hogel properties to shift towards a more optimal set of values.

3. The system of claim 1, where the set of hogel properties further comprises intensities and colors of light emerging from the hogels.

4. The system of claim 1, where the system is further configured to determine the boundaries of the hogel display.

5. The system of claim 1, where the system is further configured to determine the boundaries of the hogel display.

6. The system of claim 1, where the system is configured to detect the hogel light field substantially concurrently to generating the hogel light field.

7. The system of claim 1, where the system is further configured to:
generate other sets of hogel data, the other set of hogel data comprising information on at least one of: positions of the hogels, directions of light emerging from the hogels, and intensities and colors of light emerging from the hogels; and
apply the calibration data before, during, and/or after generating the other sets of hogel data.

8. A method comprising:
generating calibration hogel data corresponding to a calibration pattern, wherein the calibration hogel data comprises expected hogel positions of expected hogels and expected directions of expected hogel beams emerging from the expected hogels;
generating a hogel light field using a hogel light modulator based at least in part on providing the calibration hogel data to the hogel light modulator;
detecting the hogel light field;
determining, in response to detecting the hogel light field, at least one of: detected hogel positions of detected hogels, and detected directions of detected hogel beams emerging from the detected hogels; and
determining calibration data for the hogel light modulator by comparing at least one of: the detected and the expected hogel positions, and the detected and the expected directions of the detected hogel beams and the expected hogel beams respectively.

9. The method of claim 8, further comprising applying the calibration data to another hogel data, where applying the calibration data shifts the set of hogel properties towards a more optimal set of values.

10. The method of claim 8, where generating the hogel light field occurs substantially concurrently to detecting the hogel light field.

11. The method of claim 8, where the set of hogel properties further comprises intensities and colors of light emerging from the hogels.

12. The method of claim 8, further comprising determining the boundaries of the hogel display.

13. The method of claim 8, where detecting the hogel light field is substantially concurrent to generating the hogel light field.

14. The method of claim 8, further comprising:
generating another set of hogel data, the other set of hogel data comprising information on at least one of: positions of the hogels, directions of light emerging from the hogels, and intensities and colors of light emerging from the hogels; and
applying the calibration data before, during, and/or after generating the other set of hogel data.

15. A computer program product stored on a non-transitory computer operable medium, the computer program product comprising software code, wherein the software code is effective to:
generate calibration hogel data corresponding to a calibration pattern, wherein the calibration hogel data comprises expected hogel positions of expected hogels and expected directions of expected hogel beams emerging from the expected hogels;
cause a hogel light modulator to generate a hogel light field based at least in part on the calibration hogel data;
cause one or more light sensors to detect the hogel light field;
determine, in response to the detecting the hogel light field, at least one of: detected hogel positions of detected hogels, and detected directions of detected hogel beams emerging from the detected hogels; and
determine calibration data for the hogel light modulator by comparing at least one of: the detected and the expected hogel positions, and the detected and the expected directions of the detected hogel beams and the expected hogel beams respectively.

16. The product of claim 15, where the code is further effective to apply the calibration data to the generation of other sets of hogel data, where applying the calibration data shifts the set of hogel properties towards a more optimal set of values.

17. The product of claim 15, where the set of hogel properties further comprises intensities and colors of light emerging from the hogels.

18. The product of claim 15, where the code is further effective to determine the boundaries of the hogel display.

19. The product of claim 15, where the code is further effective to:
generate another set of hogel data, the other set of hogel data comprising information on at least one of: positions of the hogels, directions of light emerging from the hogels, and intensities and colors of light emerging from the hogels; and
apply the calibration data before, during, and/or after generating the other set of hogel data.

* * * * *